United States Patent
Christoff et al.

(10) Patent No.: US 6,587,624 B2
(45) Date of Patent: Jul. 1, 2003

(54) POLARIZATION RETAINING FIBER

(75) Inventors: William R. Christoff, Elmira, NY (US); Paul D. Doud, Lawrenceville, PA (US); John W. Gilliland, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 10/014,313

(22) Filed: Dec. 11, 2001

(65) Prior Publication Data

US 2002/0061402 A1 May 23, 2002

Related U.S. Application Data

(62) Division of application No. 09/194,173, filed on Nov. 20, 1998, now Pat. No. 6,360,565.
(60) Provisional application No. 60/019,597, filed on Jun. 17, 1996.

(51) Int. Cl.[7] .................................................. G02B 6/02
(52) U.S. Cl. ........................ 385/123; 385/11; 385/141
(58) Field of Search ................................ 385/123–128, 385/11, 141, 142, 144

(56) References Cited

U.S. PATENT DOCUMENTS

| | | |
|---|---|---|
| 4,179,189 A | 12/1979 | Kaminow et al. |
| 4,199,337 A | 4/1980 | Asam |
| 4,354,736 A | 10/1982 | Maklad et al. |
| 4,395,270 A | 7/1983 | Blankenship et al. |
| 4,426,129 A | 1/1984 | Matsumura et al. |
| 4,478,489 A | 10/1984 | Blankenship et al. |
| 4,561,871 A | 12/1985 | Berkey |
| 4,630,889 A | 12/1986 | Hicks, Jr. |
| 4,750,926 A | 6/1988 | Berkey |
| 4,828,592 A | 5/1989 | Matsumura et al. |
| 4,838,916 A | 6/1989 | Edahiro et al. |
| 4,859,223 A | 8/1989 | Kajioka et al. |
| 4,978,337 A | 12/1990 | Brehm et al. |
| 5,149,349 A | 9/1992 | Berkey et al. |
| 5,152,818 A | 10/1992 | Berkey et al. |
| 5,160,522 A | 11/1992 | Takagi et al. |
| 5,482,525 A | 1/1996 | Kajioka et al. |

FOREIGN PATENT DOCUMENTS

| | | | |
|---|---|---|---|
| JP | 59-125702 | 7/1984 | |
| JP | 62-153136 | * 7/1987 | ............ G02B/6/16 |
| JP | 3-16929 | 1/1991 | |
| JP | 03-223131 | * 10/1991 | ............ G02B/6/16 |

OTHER PUBLICATIONS

Ramaswamy et al.; *Single Polarization Optical Fibers: Exposed Cladding Technique*; Applied Physics Letters; vol. 33, No. 9, Nov. 1, 1978, pp. 814–816.

European Patent Office Patent Abstract of Japan, Publication No. 59015905, Jan. 27, 1984, Application No. 57126215, Hitachi Cable Ltd., "Optical Fiber Which Maintains Plane of Plarization".

European Patent Office Patent Abstract of Japan, Publication No. 60090306, May 21, 1985, Application No. 58198731, Hitachi Cable Ltd., "Polarizing Plane Maintaining Optical Fiber".

* cited by examiner

*Primary Examiner*—Rodney Bovernick
*Assistant Examiner*—Juliana K. Kang
(74) *Attorney, Agent, or Firm*—Joseph M. Homa; Robert L. Carlson

(57) ABSTRACT

A glass preform is drawn into a fiber. Holes, running the length of the preform, collapse during the drawing, causing the core to have an elliptical cross section.

9 Claims, 3 Drawing Sheets

POLARIZATION RETAINING FIBER

This application claims the benefit of priority of divisional U.S. patent application Ser. No. 09/194,173 filed on Nov. 20, 1998 now U.S. Pat. No. 6,360,565, which claims the benefit of U.S. Provisional Application Serial No. 60/019,597 filed on Jun. 17, 1996 the benefit of priority is hereby claimed.

BACKGROUND OF THE INVENTION

This invention relates to the fabrication of polarization retaining single-mode (PRSM) optical fibers and more particularly to the fabrication of preforms from which fibers having elliptically-shaped cores can be drawn.

In many applications of single-mode optical fibers, eg. gyroscopes, sensors and the like, it is important that the propagating optical signal retain the polarization characteristics of the input light in the presence of external depolarizing perturbations. This requires the waveguide to have an azimuthal asymmetry of the refractive index profile.

One of the first techniques employed for improving the polarization performance of single-mode fibers was to distort the symmetry of the core. A method of making this kind of PRSM fiber is disclosed in U.S. Pat. No. 5,149,349, which is incorporated herein by reference. A PRSM optical fiber is formed by drawing a fiber from a draw blank having a glass core surrounded by cladding glass containing apertures that are diametrically opposed with respect to the core. The fiber is drawn at such a rate and temperature that the apertures close and the core becomes elliptically-shaped. In a preferred method of making the draw blank, longitudinal grooves are formed on diametrically opposed sides of a cylindrically-shaped core preform in which the glass core is surrounded by the cladding glass. Glass particles are deposited on the outer surface of a glass tube, and the core preform is inserted into the tube. The resultant assembly is heated to sinter or consolidate the particles, whereby the tube is collapsed and fused to the grooved core preform to form an assembly having longitudinal apertures on opposite sides of the core.

When the aperture-containing blank is drawn to form the PRSM fiber, the apertures close due to surface tension and the flow of molten glass into the apertures. This flow causes the round core of the blank to become elongated in the direction of the apertures. The core aspect ratio of the elliptically-shaped core is primarily determined by the spacing between the core and the apertures. As the spacing between the core and the apertures in the draw blank decreases, the core of the resultant fiber becomes more elongated in cross-section, but the core cross-section tends to have long thin ends. If the spacing is too small, the core may break through the cladding region between core and apertures, resulting in the formation of a core the cross-section of which is flattened with undesirable flared ends. By "ends" is meant the tips of the elongated core along the major axis of the core as observed in a plane perpendicular to the fiber longitudinal axis.

SUMMARY OF THE INVENTION

It is therefore an object of the invention to provide a method of making PRSM optical fibers which overcomes the disadvantages of the prior art. A further object is to provide a PRSM fiber producing method which is relatively simple to practice. Yet another object is to provide a method for making elliptical core PRSM fibers having improved core cross-sectional shape.

In accordance with the present method, a polarization maintaining single-mode optical fiber is formed by initially forming an optical fiber draw blank having a glass core region of refractive index $n_1$ surrounded by a cladding glass region of refractive index $n_2$. The cladding region includes apertures that are diametrically opposed with respect to the core region and that are spaced from the core region. The draw blank has a region of low viscosity glass between the core region and the apertures, the low viscosity glass region having a refractive index $n_3$ and a viscosity lower than that of the cladding glass region. An optical fiber is drawn from the draw blank at such a rate that the apertures close and the core becomes elliptical in cross-section.

Another aspect of the invention pertains to an optical fiber having an elliptically-shaped core of aspect ratio $\rho_1$, where $\rho_1$ equals $b_1/a_1$, $b_1$ being the major axis radius and $a_1$ being the minor axis radius of the core. Surrounding the core is a low viscosity glass region of elliptically-shaped cross-sectional configuration having an aspect ratio $\rho_2$ that is equal to $b_2/a_2$, $b_2$ being the major axis radius and $a_2$ being the minor axis radius of the low viscosity region. The aspect ratio $\rho_2$ of the low viscosity region is less than $\rho_1$. A cladding glass region surrounds the low viscosity region. The viscosity of low viscosity region is lower than that of the cladding glass region.

DESCRIPTION OF THE PREFERRED EMBODIMENT

It is to be noted that the drawings are illustrative and symbolic of the invention, and there is no intention to indicate scale or relative proportions of the elements shown therein.

Figure 1:
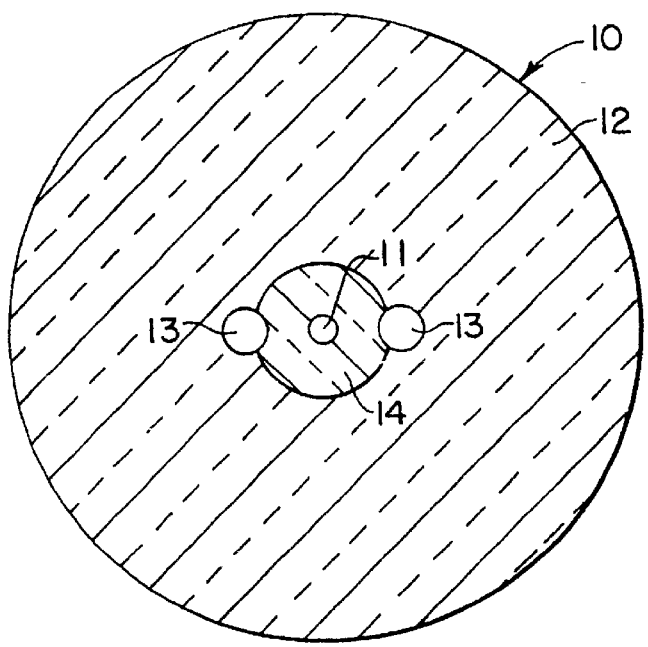
FIG. 1 is a cross-sectional view of a preform from which a elliptical core PRSM fiber can be drawn.

Draw blank 10 of FIG. 1, from which a PRSM fiber can be drawn, has core and cladding regions 11 and 12, respectively. The core and cladding regions may be formed of conventional materials employed in the formation of optical waveguides. The salient characteristics of these materials are that the refractive index $n_1$ of the core material must be greater than the refractive index $n_2$ of the cladding material and that both materials must exhibit low losses at the wavelength at which the waveguide is intended to be operated. By way of example only, core region 11 may consist of pure silica or silica containing one or more dopants which increase the refractive index thereof. Region 12 may consist of pure silica, silica containing a lesser amount of refractive index increasing dopant than core region 11, or silica containing one or more dopants, at least one of which is a refractive index lowering dopant such as $B_2O_3$ or fluorine. Although silica is a preferred base glass because it exhibits low loss at useful wavelengths, base glass materials other than silica may be employed.

In accordance with the invention a region 14 of low viscosity relative to that of cladding 12 is disposed between core 11 and apertures 13. The viscosity of low viscosity region 14 is preferably close to or slightly lower than that of core 11. This can be accomplished, for example, by forming region 14 of silica doped with appropriate amounts of one or more viscosity lowering dopants such as $B_2O_3$, fluorine, $P_2O_5$, $GeO_2$ and the like.

The refractive index $n_3$ of region 14 should be equal to or less than $n_2$. The refractive index of region 14 can be made to be equal to that of cladding 12 by, for example, forming region 14 of silica doped with appropriate amounts of one or more refractive index decreasing dopants such as $B_2O_3$ and fluorine and one or more refractive index increasing dopants such as $P_2O_5$, $GeO_2$ and the like.

The refractive index of region 14 can be made to be lower than that of cladding 12 by, for example, employing a silica cladding 12 and forming region 14 of silica doped with $B_2O_3$ or fluorine or by doping silica with a refractive index increasing dopant such as $P_2O_5$, $GeO_2$ and the like as well as a sufficient amount of $B_2O_3$ and/or fluorine to reduce the refractive index of the composite material to a value less than that of silica. Examples of elliptical core fibers having this type of refractive index profile are disclosed in U.S. Pat. No. 5,482,525.

Apertures 13 extend longitudinally through blank 10 parallel to core region 11. While apertures 13 are illustrated as being D-shaped in cross-section, the cross-sectional configuration could be crescent shaped, circular, or the like. Any shape that results in the desired cross-sectional elongation of the core during fiber draw is considered to be suitable.

Figure 2:
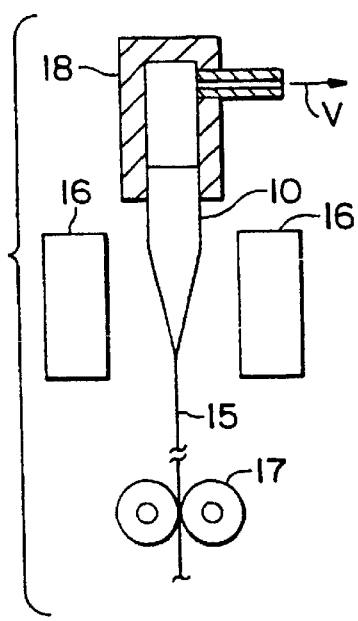
FIG. 2 is a schematic diagram illustrating the drawing of a PRSM fiber from the preform of FIG. 1.

Referring to FIG. 2, draw blank 10 is placed in a conventional draw furnace where tractors 17 pull fiber 15 from the bottom portion of blank 10 which is heated to draw temperature by heating elements 16. The tendency for apertures 13 to close is a function of draw rate and glass viscosity. The viscosity of the draw blank root from which the fiber is drawn depends upon furnace temperature and glass composition. If the viscosity of the heated portion of the blank is sufficiently low and the draw rate is sufficiently low, apertures 13 will naturally close during the draw process. Since the apertures more readily close if they are evacuated, draw speed can be increased by affixing a vacuum attachment 18 to the upper end of the blank.

Figure 3:
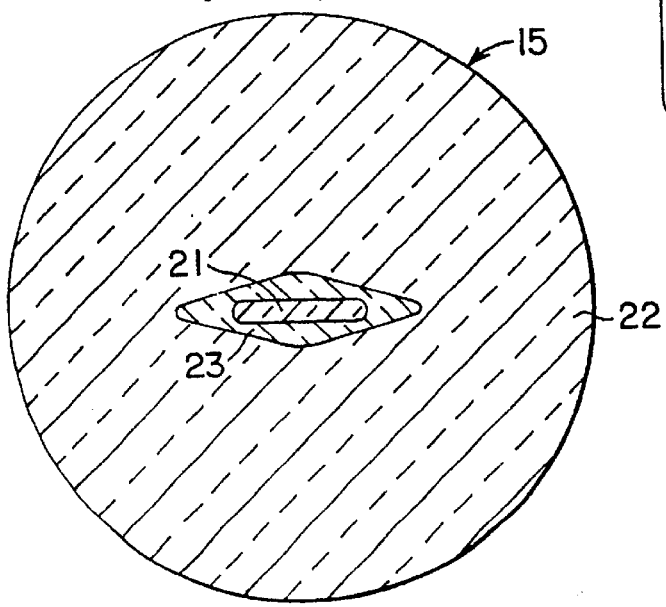
FIG. 3 is a cross-sectional view of a PRSM fiber produced by the present method.
Figure 4:
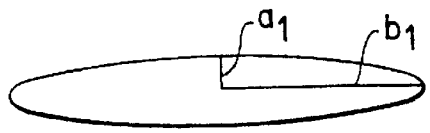
FIGS. 4 and 5 are diagrams showing the major axis radius and the minor axis radius of the elliptical core and its surrounding low viscosity region, respectively.

As apertures 13 close, they are replaced by the surrounding glass. When glass at smaller radii than the apertures flows radially outwardly into the apertures, core region 11 becomes elongated in cross-section. The resultant PRSM fiber 15, the cross-section of which includes cladding 22, oblong core 21 and low viscosity region 23, is shown in FIG. 3. The ellipticity or aspect ratio of the elliptical core is the ratio of its major dimension to its minor dimension in a plane perpendicular to the fiber axis (see FIG. 4). Cores of varying degrees of ellipticity can be made depending, inter alia, on the size of apertures 13 and the spacing between those apertures and the core.

In accordance with the method of this invention, the shape of elliptical core 21 is also a function of the viscosity of region 23. When the glass of draw blank 10 starts to flow, the flow of core glass toward the apertures will be less restricted by the intervening glass between core region 11 and apertures 13 than was the case when that intervening glass was silica. Thus, core region 11 can flow farther toward the apertures before they close. Since the outer cladding 12 has a relatively high viscosity, e.g. that of pure silica, the flow of that glass into the apertures is very small; thus the core glass and the low viscosity region 14 can flow more.

Figure 5:
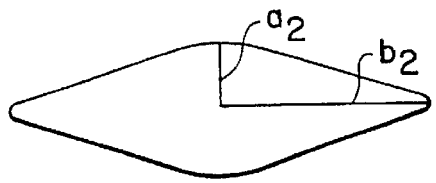

Consequently, the cross-sectional shape of core 21 is more bar-shaped (FIG. 4) as opposed to the usual shape with relatively pointed ends and a bulging middle. In the fiber resulting from the present process, the low viscosity region 14 assumes a cross-sectional shape 23 (FIG. 3) having ends that are more pointed than the ends of core 21 and a middle section that bulges more than the middle of the core. A comparison of FIGS. 4 and 5, which are relatively accurate representations of the cross-sections of core 21 and region 23, reveals that the aspect ratio $b_1/a_1$ of elliptical core 21 is greater than the aspect ratio $b_2/a_2$ of low viscosity region 23.

Apertures 13 must be parallel to the core and uniform in cross-sectional area throughout the longitudinal axis of draw blank 10 if fiber 15 is to have uniform properties throughout its length. Any conventional technique that meets these requirements can be used for forming the apertures. UK Patent Application GB 2,192,289 teaches two techniques for forming longitudinal holes in a preform on opposite sides of the core:

(1) The holes can be drilled with a diamond drill.

(2) A core preform having opposed flattened sides is placed in the center of a glass tube, and two glass rods are placed on opposite sides of of the core preform, leaving two opposed unfilled regions between the core preform and the tube. The resultant assembly is drawn to reduce the diameter thereof and to cause the glass members to fuse together to form an article that has a solid cross-section except for two opposed axe-head shaped holes that correspond to the unfilled regions.

Figure 6:
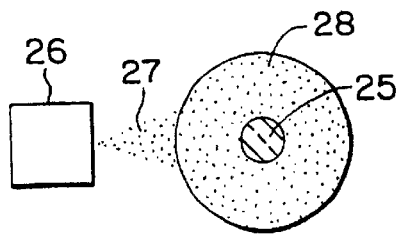
FIG. 6 illustrates the application of a coating of glass particles to a mandrel.
Figure 7:
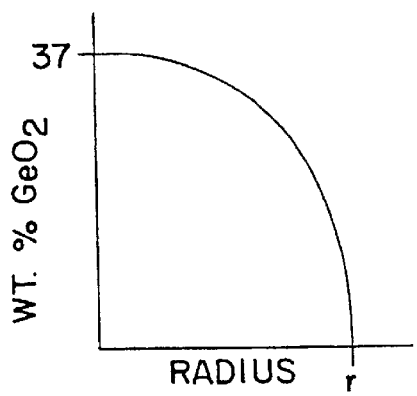
FIG. 7 is a graph showing the core refracative index profile.

An elliptical core PRSM fiber was made in accordance with the method illustrated in FIGS. 6–10. A cylindrical mandrel 25 (FIG. 6) was rotated and translated with respect to a flame hydrolysis burner 26 such that a stream 27 of glass particles or soot formed a porous coating 28 on the mandrel. The composition of the soot stream 27 was initially $SiO_2$ doped with 37 wt. % $GeO_2$, the concentration of $GeO_2$ decreasing with increasing radius as shown in FIG. 7. The coated mandrel was removed from the lathe, and the mandrel was removed from the porous preform, thereby leaving a longitudinal aperture in the porous preform. The porous preform was then dried and consolidated in accordance with the teachings of U.S. Pat. No. 4,125,388. The resultant consolidated preform or core blank 30 was inserted into the draw apparatus of FIG. 8 where its tip was heated to drawing temperature by heating means 32, and vacuum connection 34 was affixed to its upper end. After the end of the preform was stretched so that its aperture 35 was either very narrow or completely closed, the aperture was evacuated through fixture 34. As the lower end of the preform was pulled downwardly, and its diameter decreased, the evacuated aperture 35 collapsed. The radius r of the resultant α-cane 31 was 6 mm. Its germania concentration profile is shown in FIG. 7.

A plurality of 90 cm sections were severed from the α-cane, and one of the sections was inserted into a lathe and coated with $SiO_2$ soot as described in conjunction with FIG. 6. The resultant composite preform was consolidated at 1450° C. while a mixture of 94.3 volume percent helium, 1.0 volume percent chlorine and 4.7 volume percent $SiF_4$ flowed upwardly through the muffle. In the resultant consolidated preform the diameter of the fluorine-doped silica layer was 13.4 mm, and the core diameter was about 6.2 mm.

The consolidated preform was inserted into a lathe and coated with $SiO_2$ soot which was consolidated in an atmosphere of chlorine and helium to form a pure silica layer over the fluorine-doped silica layer.

Longitudinally-extending grooves were ground through the outer silica cladding layer on opposite sides of the core such that they extended into the fluorine-doped low viscosity region. After the grinding operation, the grooved β-blank (FIG. 9) was cleaned and rinsed.

Figure 8:
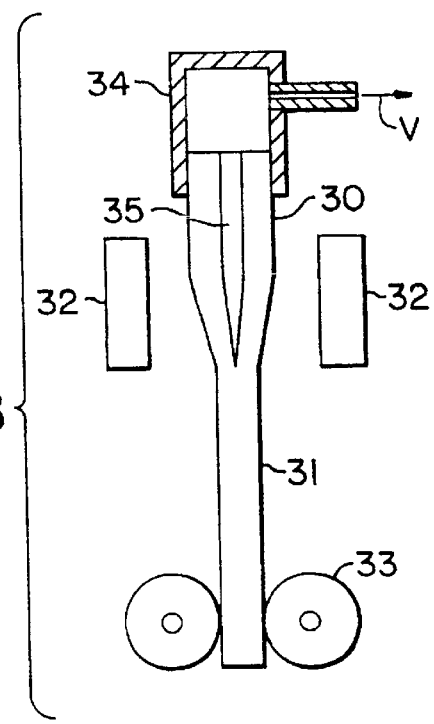
FIG. 8 is a schematic diagram illustrating the drawing of a rod from a consolidated core glass tube.

The grooved β-blank was then inserted into a conventional draw furnace of the type illustrated in FIG. 8 where it was stretched to reduce its diameter to about 7.3 mm. The resultant β-cane 40 (FIG. 10) includes core region 41, silica cladding layer 42 and low viscosity region 43. Slots 44 extend longitudinally along β-cane 40 on opposite sides of core region 41.

Silica cladding tube 47 had inside and outside diameters of 7.5 mm and 9.5 mm, respectively. An end of tube 47 was tapered inwardly and fused to a handle suitable for supporting assembly 52 in a consolidation furnace. Grooved β-cane 40 was inserted into the end of tube 47 opposite the tapered end until it contacted the tapered end. The end of tube 47 into which preform 40 was inserted was tapered inwardly and fused to a glass rod. Tube 47 was then mounted in a lathe where it was rotated and translated with respect to a soot deposition burner where particles of silica soot were deposited thereon to build up porous coating 48, thereby forming assembly 52.

Assembly 52 was lowered into a consolidation furnace where it was subjected to a drying gas mixture of chlorine and helium and then sintered to form optical fiber draw blank 10 of FIG. 1. As coating 48 consolidated, it exerted a force radially inwardly on tube 47, thereby forcing that tube inwardly against preform 40. The original cladding region 42 and tube 47 are completely fused together, and porous coating 48 has become completely sintered and fused to tube 47, these layers forming cladding 12.

The resultant draw blank was inserted into a draw furnace, where an optical fiber was then drawn from the preform.

Figure 10:
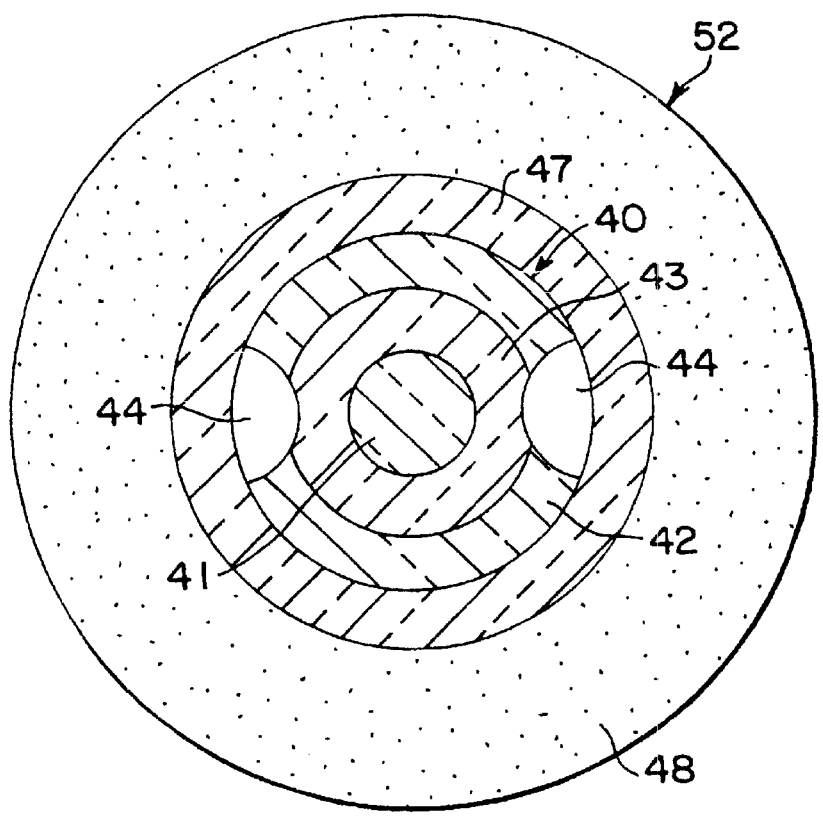
FIG. 10 is a cross-sectional view of an assembly wherein a grooved core cane is disposed in a soot-coated cladding glass tube.

A grooved β-blank made by the above-described process can be characterized by the dimensions C, D, E and R of FIG. 10. Five different grooved β-blanks, which were made by the above-described method, were employed to form draw blanks that were drawn into optical fibers 1 through 5, which are characterized in Table 1. In each of the grooved β-blanks the radius R of the core region was about 3.5 mm.

TABLE 1

| Fiber No. | Soot Weight | wt. % fluorine | Dimension E (mm) | Dimension C (mm) | Aspect Ratio |
|---|---|---|---|---|---|
| C1 | N/A | None | 1.73 | N/A | 5.3 |
| C2 | N/A | None | 1.80 | N/A | 5.1 |
| C3 | N/A | None | 1.98 | N/A | 5.8 |
| 1 | 160 g | 1.6 | 1.53 | 11.99 | 6.2 |
| 2 | 160 g | 1.6 | 1.53 | 11.99 | 6.3 |
| 3 | 126 g | 1.0 | 1.25 | 10.42 | 7.6 |
| 4 | 66 g | 1.0 | 0.70 | 6.14 | 8.3 |
| 5 | 62 g | 1.0 | 1.40 | 6.40 | 6.0 |

Figure 9:
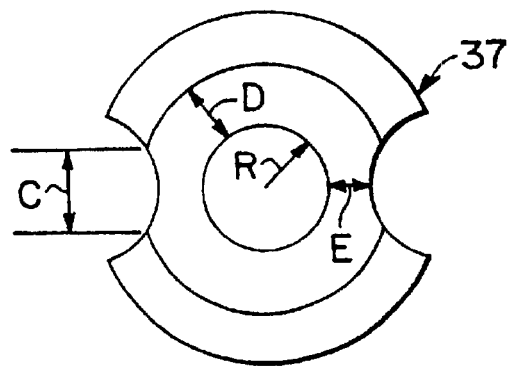
FIG. 9 is a schematic diagram illustrating the various dimensions of a grooved-blank.

The dimension D of FIG. 9 was not measured but is related to the "soot weight" listed in Table 1. The soot weight is the weight of the silica glass particles that are deposited to form low viscosity region 43. The coating made up of those particles is then doped with fluorine and consolidated. A greater soot weight will result in a greater thickness D.

The relatively high aspect ratio of fibers 3 and 4 indicates that a relatively small dimension E is preferred.

The three comparison fibers C1, C2 and C3 of Table 1 were made by a process similar to that by which fibers 1 through 5 were made, but no low viscosity, fluorine-doped silica region 43 was employed. That is, the entire cladding from the core to the outer surface of the fiber was formed of $SiO_2$. The aspect ratios of fibers C1, C2 and C3 are lower than the aspect ratios of fibers 1 through 5.

In the embodiment of FIG. 1 the low viscosity region 14 extends from the core 11 and into the apertures 13. It is thought that some improvement in aspect ratio would be achieved if region 14 did not quite extend to apertures 13, but the effect on improved aspect ratio would not be as great as the improved effect achieved by the embodiment of FIG. 1.

What is claimed is:

1. An optical fiber comprising
a core having a viscosity, refractive index $n_1$ and an elliptically-shaped cross-section having a major axis radius $b_1$, a minor axis radius $a_1$ and an aspect ratio $\rho_1$, wherein $\rho_1$ equals $b_1/a_1$;
a low viscosity glass layer having a viscosity not greater than the viscosity of said core, an elliptically-shaped cross-section surrounding said core, said low viscosity layer having a major axis radius $b_2$ and a minor axis radius $a_2$, and an aspect ratio $\rho_2$, wherein $\rho_2$ equals $b_2/a_2$, wherein the aspect ratio $\rho_1$ is greater than the aspect ratio $\rho_2$; and
a cladding glass layer having a viscosity and a refractive index $n_2$ surrounding said low viscosity layer, the viscosity of said low viscosity layer being lower than the viscosity of said cladding glass region.

2. The optical fiber according to claim 1 wherein said low viscosity layer is formed of $SiO_2$ containing dopants selected from the group consisting of $B_2O_3$, fluorine, $P_2O_5$ and $GeO_2$.

3. The optical fiber according to claim 1 wherein said cladding glass layer consists of pure $SiO_2$.

4. The optical fiber according to claim 1 wherein the viscosity of the low viscosity glass layer at a draw temperature is not greater than the viscosity of the core at the draw temperature.

5. The optical fiber according to claim 1 wherein the viscosity of the low viscosity layer at a draw temperature is lower than the viscosity of the cladding region at the draw temperature.

6. The optical fiber according to claim 1 wherein the viscosity of the low viscosity glass layer at a draw temperature is not greater than the viscosity of the core at the draw temperature, and the viscosity of the low viscosity layer at the draw temperature is lower than the viscosity of the cladding glass region at the draw temperature.

7. An optical fiber comprising
a core having a viscosity at a draw temperature, refractive index $n_1$ and an elliptically-shaped cross-section having a major axis radius $b_1$, a minor axis radius $a_1$ and an aspect ratio $\rho_1$, wherein $\rho_1$ equals $b_1/a_1$;
a low viscosity glass layer having a viscosity at the draw temperature not greater than the viscosity of the core at the draw temperature, an elliptically-shaped cross-section surrounding the core, the low viscosity layer having major axis radius $b_2$ and a minor axis radius $a_2$, and an aspect ratio $\rho_2$, wherein $\rho_2$ equals $b_2/a_2$, wherein the aspect ratio $\rho_1$ is greater than the aspect ratio $\rho_2$; and a cladding glass layer having a viscosity at a draw temperature and a refractive index n2 surrounding the low viscosity layer, the viscosity of the low viscosity layer at the draw temperature being lower than the viscosity of the cladding glass region at the draw temperature.

8. The optical fiber according to claim 7 wherein said low viscosity layer is formed of $SiO_2$ containing dopants selected from the group consisting of $B_2O_3$, fluorine, $P_2O_5$ and $GeO_2$.

9. The optical fiber according to claim 7 wherein said cladding glass layer consists of pure $SiO_2$.

* * * * *